(12) United States Patent
Matayoshi et al.

(10) Patent No.: US 6,673,464 B2
(45) Date of Patent: Jan. 6, 2004

(54) SOFT RESIN COMPOSITION FOR INJECTION MOLDING AND USES THEREOF

(75) Inventors: Tomoya Matayoshi, Nagoya (JP); Naoto Yasaka, Ichihara (JP); Masayoshi Yamaguchi, Ichihara (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 10/046,706

(22) Filed: Jan. 17, 2002

(65) Prior Publication Data
US 2002/0132128 A1 Sep. 19, 2002

(30) Foreign Application Priority Data

Jan. 17, 2001 (JP) .......................... 2001-009142

(51) Int. Cl.[7] ............................ B32B 27/32; C08L 23/04
(52) U.S. Cl. ........................ 428/517; 428/516; 525/191; 525/240
(58) Field of Search ................................ 525/191, 240; 428/515, 517, 516

(56) References Cited

FOREIGN PATENT DOCUMENTS

| EP | 0 351 189 A2 | 1/1990 |
|---|---|---|
| EP | 0 791 626 | 8/1997 |
| WO | WO97/10295 | 3/1997 |

Primary Examiner—D. S. Nakarani
(74) Attorney, Agent, or Firm—Birch, Stewart, Kolasch & Birch, LLP

(57) ABSTRACT

The soft resin composition for injection molding comprises (A) an ethylene/α-olefin copolymer comprising ethylene and an α-olefin of 3 to 10 carbon atoms and (B) a polyethylene in a specific ratio. The component (A) has a Shore A hardness of 40 to 95, a melt flow rate ($MFR_{2.16}$) of 1.0 to 20 g/10 min, and a density of 855 to 900 $kg/m^3$; and the component (B) has a melt flow rate ($MFR_{2.16}$) 0.1 to 100 g/10 min, a density of 910 to 925 $kg/m^3$, and a melt tension measured at 190° C. and the $MFR_{2.16}$ satisfying the relation: melt tension>$2.2\times(MFR_{2.16})^{-0.84}$. The injection-molded product of the present invention comprises the above soft resin composition, and may have been subjected to coating on its surface. The toy and the article for daily use of the invention comprise the injection-molded product. The soft resin composition for injection molding is capable of producing, with good productivity, an injection-molded product having an excellent translucent appearance while maintaining the flexibility; and the injection molded article of the composition is employable as a soft toy or an article for daily use. The coated product of such an injection-molded product has excellent adhesion of the coating.

18 Claims, 5 Drawing Sheets gate side gate side

SOFT RESIN COMPOSITION FOR INJECTION MOLDING AND USES THEREOF

FIELD OF THE INVENTION

The present invention relates to a soft resin composition for injection molding and uses thereof. More particularly, the invention relates to a soft resin composition for injection molding, which is a polyolefin composition containing an ethylene/α-olefin copolymer, and is capable of producing, with good productivity, an injection-molded product being excellent in flexibility, transparency and texture and being suitably used as soft toys and articles for daily use, etc., an injection-molded product thereof, and a coated product of such a product.

BACKGROUND OF THE INVENTION

Polyolefins, such as relatively soft ethylene/α-olefin copolymers having a Shore A hardness of 40 to 95, especially those having a Shore A hardness of 40 to 70, are of low crystallinity or amorphous to cause the following problems related to molding when they are injection-molded as being such a copolymer.

The problems related to molding are, specifically, that a molten resin filled in a desired mold through injection requires a long time to reach a hardened state sufficient to be released from the mold (such a time is referred to as "cooling time" hereinafter), and molded products have molding defects such as sinkmarks and flash. The time-consuming cooling time prolongs a molding cycle, resulting in a lowered productivity of injection-molded products. The occurrence of molding defects, such as sinkmarks and flash, increases an inferior injection-molded product rate. Molded products should avoid the occurrence of these defects. A soft ethylene/α-olefin copolymer of lower crystallinity has a slower hardening rate and therefore tends to cause the above problems related to molding.

For the only purpose of increasing the hardening rate, a low crystalline or amorphous ethylene/α-olefin copolymer can be blended with a filler such as an inorganic filler and a resin having a relatively high hardening rate such as high crystalline polypropylene and polyethylene. The above method, however, has a drawback in that the flexibility and the translucency inherent in the ethylene/α-olefin copolymer are deteriorated, although the hardening rate of the ethylene/α-olefin copolymer is increased.

There is no coatings or primers exhibiting good adhesion to the ethylene/α-olefin copolymer, and therefore a molded product comprising the ethylene/α-olefin copolymer is not suitable for uses that necessarily require coating.

Accordingly, there is desired a soft resin composition for injection molding, which is capable of producing, with good productivity, an injection-molded product excellent in translucency and appearance without substantially decreasing the transparency while maintaining flexibility inherent in the low crystalline or amorphous ethylene/α-olefin copolymer, and an injection-molded product thereof and especially an injection molded product excellent in adhesion to coating.

OJBECT OF THE INVENTION

The present invention has been made in order to solve the above problems related to the prior art, and an object of the present invention is to provide a soft resin composition for injection molding which is capable of producing, with good productivity, a translucent injection-molded product excellent in appearance without causing a substantial decrease of transparency while maintaining flexibility inherent in the low crystalline or amorphous ethylene/α-olefin copolymer, and an injection-molded product thereof usable as soft toys and articles for daily use.

Another object of the invention is to provide an injection-molded product of the above properties, which have been subjected to color-finishing with a coating and is excellent in adhesion of coating.

SUMMARY OF THE INVENTION

The soft resin composition for injection molding of the present invention comprises:

(A) 94 to 99 parts by weight of an ethylene/α-olefin copolymer comprising ethylene and an α-olefin of 3 to 10 carbon atoms and having
  (i) a Shore A hardness (JIS K 6253) of 40 to 95,
  (ii) a melt flow rate ($MFR_{2.16}$), as measured at 190° C. under 2.16 kg load in accordance with ASTM D 1238, of 1.0 to 20 g/10 min, and
  (iii) a density (ASTM D 1505) of 855 to 900 kg/m³; and
(B) 1 to 6 parts by weight of a polyethylene having
  (i) a melt flow rate ($MFP_{2.16}$), as measured at 190° C. under 2.16 kg load in accordance with ASTM D 1238, of 0.1 to 100 g/10 min,
  (ii) a density (ASTM D 1505) of 910 to 925 kg/m³, and
  (iii) a melt tension measured at 190° C. and the $MFR_{2.16}$ satisfying the following relation:

$$\text{melt tension} > 2.2 \times (MFR_{2.16})^{-0.84},$$

wherein the sum of the component (A) and the component (B) is 100 parts by weight.

The soft resin composition for injection molding comprising the components (A) and (B) preferably has a Shore A hardness of 90 or less.

The soft resin composition for injection molding of the invention preferably has a ratio (HAB/HA) of the Shore A hardness (JIS K 6253) of the soft resin composition for injection molding (HAB) to the Shore A hardness (JIS K 6253) of the ethylene/α-olefin copolymer (A) (HA) of 1.00 to 1.05.

The ethylene/α-olefin copolymer (A) preferably has:
  (iv) a molecular weight distribution (Mw/Mn), as determined by a gel permeation chromatography (GPC), of 1 to 3, and
  (v) a ratio ($MFR_{10}/MFR_{2.16}$) of a melt flow rate ($MFR_{10}$: g/10 min) as measured at 190° C. under 10 kg load in accordance with ASTM D 1238 to the $MFR_{2.16}$ (g/10 min) of 5 to 20.

The ethylene/α-olefin copolymer (A) may be a mixture of at least two ethylene/α-olefin copolymers (A).

The injection-molded product of the invention comprises the soft resin composition for injection molding described above.

The injection-molded product of the invention may have been subjected to coating on the surface.

The coated product is preferably an injection-molded product having been subjected to color-finishing with a coating material, the color-finishing being made by coating the surface of the above-mentioned injection-molded product with a primer comprising a styrene elastomer resin graft-polymerized with a monomer having an α,β-monoethylenically unsaturated group, and then conducting the coating.

Highly preferably, the coated product of the invention is an injection-molded product having been subjected to color-finishing with a coating material, the color-fishing being made by coating the surface of the above-mentioned injection-molded product with a mixture of the primer and a photopolymerization initiator, subjecting the coated surface to UV-ray treatment, and then conducting the coating.

The toys and the articles for daily use of the present invention comprise the above-mentioned injection-molded product.

DETAILED DESCRIPTION OF THE INVENTION

Figure 1:
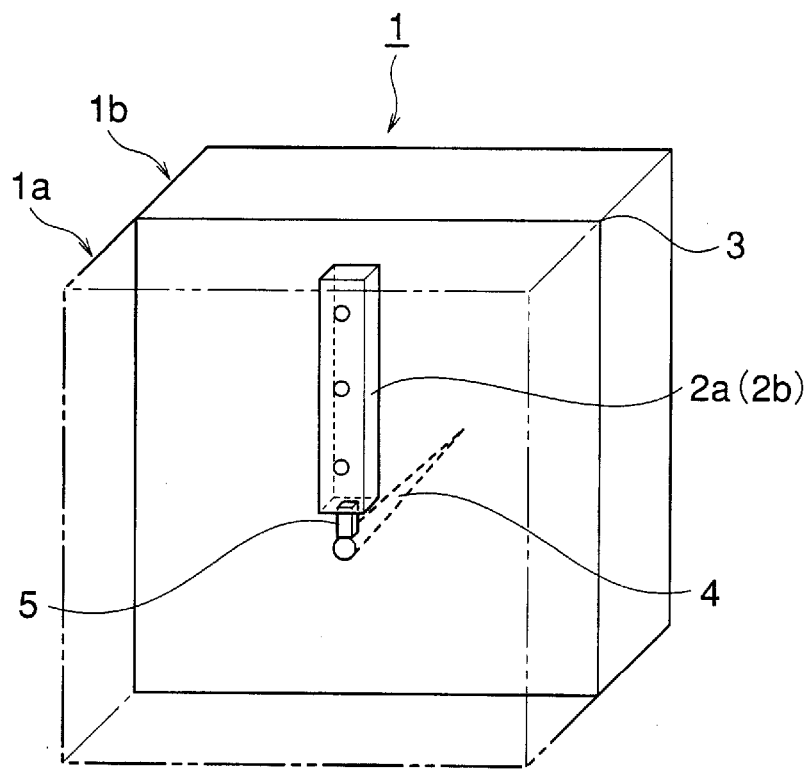
FIG. 1 is a schematic perspective view showing a mold for injection molding for producing a molded product that is used for the evaluation tests of (A) depression depth and (B) hardness ratio (B) in Examples and Comparative Examples.

The soft resin composition for injection molding of the present invention and uses thereof are described in detail hereinafter.

The soft resin composition for injection molding comprises an ethylene/α-olefin copolymer (A) and a polyethylene (B).

Ethylene/α-olefin Copolymer (A)

The ethylene/α-olefin copolymer (A) used in the invention is a low crystalline or amorphous random copolymer comprising ethylene and an α-olefin of 3 to 10 carbon atoms. The copolymer (A) is a soft ethylene/α-olefin copolymer having a Shore A hardness (HA: JIS K 6253) of 40 to 95, preferably 50 to 95, more preferably 60 to 90. The copolymer (A) has a melt flow rate ($MFR_{2.16}$), as measured at 190° C. under 2.16 kg load in accordance with ASTM D1238, of 1.0 to 20 g/10 min, preferably 1.0 to less than 10.0 g/10 min, more preferably 1.0 to 8.0 g/10 min. The melt flow rate of the above range achieves excellent moldability and releasability in the injection molding, and gives a molded product having excellent flexibility and rarely holding a permanent set. The density (ASTM D 1505) of the copolymer (A) is 855 to 900 kg/m$^3$, preferably 880 to 900 kg/m$^3$.

The ethylene/α-olefin copolymer (A) preferably has a ratio ($MFR_{10}/MFR_{2.16}$) of a melt flow rate measured at 190° C. under 10 kg load in accordance with ASTM D 1238 ($MFR_{10}$) to the $MFR_{2.16}$ of 5 to 20.

The ethylene/α-olefin copolymer (A) has a molecular weight distribution (Mw/Mn), as determined by a gel permeation chromatography (GPC), of preferably 1 to 3, more preferably 1.5 to 3. The use of the ethylene/α-olefin copolymer (A) having a molecular weight distribution (Mw/Mn) of the above range can prepare a composition having excellent releasability in the injection molding and exhibiting only slight tackiness when molded into a product.

The molecular weight distribution (Mw/Mn) is measured using a GPC-150 C (produced by MILLIPORE, Co.) according to the following procedures.

The measurement is carried out using a separatory column TSK-GNH-HT having a diameter of 72 mm and a length of 600 mm at a column temperature of 140° C. 500 microliters of a sample having a concentration of 0.1% by weight is moved at a rate of 1.0 ml/min using o-dichlorobenzene (Wako Pure Chemical Industries, Ltd.) as a mobile phase and 0.025% by weight of BHT (Takeda Chemical Industries, Ltd.) as an antioxidant. A differential refractometer is used as a detector. An ethylene/propylene copolymer rubber (EPR) having a known molecular weight is used as a standard sample to determine Mw and Mn of the ethylene/α-olefin copolymer (A).

The α-olefin to be copolymerized with ethylene has 3 to 10 carbon atoms. Specific examples of the α-olefin include propylene, 1-butene, 1-pentene, 1-hexene, 1-heptene, 1-octene, 1-nonene, 1-decene and 4-methyl-1-pentene. Of these, propylene, 1-butene, 1-hexene and 1-octene are preferable. These α-olefins can be used either individually or in combination.

Preferably, the ethylene/α-olefin copolymer (A) contains units derived from ethylene in an amount of 80 to 95% by mol and units derived from an α-olefin of 3 to 10 carbon atoms in an amount of 5 to 20% by mol.

The composition of the ethylene/α-olefin copolymer (A) is generally determined as follows. Approximately 200 mg of an ethylene/α-olefin copolymer is uniformly dissolved in 1 ml of hexachlorobutadiene in a sample tube having a diameter of 10 mmø to prepare a sample. The $^{13}$C-NMR spectrum of the sample is measured to determine the composition under the conditions of a temperature of 120° C., a frequency of 25.05 MHz, a spectral width of 1500 Hz, a pulse repetition time of 4.2 sec., and a pulse duration of 6 μsec.

The ethylene/α-olefin copolymer (A) may contain units derived from other polymerizable monomer(s) in addition to the above-described units within the limit not detrimental to the objects of the invention.

Examples of the ethylene/α-olefin copolymer (A) include an ethylene/propylene random copolymer, an ethylene/1-butene random copolymer, an ethylene/propylene/1-butene random copolymer, an ethylene/1-hexene random copolymer and an ethylene/1-octene random copolymer. Of these, an ethylene/propylene random copolymer, an ethylene/1-butene random copolymer, an ethylene/1-hexene random copolymer and an ethylene/1-octene random copolymer are preferably used. These copolymers may be used either individually or in combination.

The ethylene/α-olefin copolymer (A) has a crystallinity, as measured by X-ray diffractometry, of 40% or less, preferably from 10 to 30%.

The ethylene/α-olefin copolymer (A) may be prepared by a known method using a vanadium catalyst or a metallocene catalyst, for example, a metallocene catalyst described in WO 97/10295.

The ethylene/α-olefin copolymer (A) is used in an amount of 94 to 99 parts by weight, preferably 95 to 99 parts by weight, based on 100 parts by weight of the sum of the ethylene/α-olefin copolymer (A) and the polyethylene (B).

Polyethylene (B)

The polyethylene (B) used in the invention has a melt flow rate ($MFR_{2.16}$) measured at 190° C. under 2.16 kg load in accordance with ASTM D 1238 of 0.1 to 100 g/10 min, preferably 1 to 50 g/10 min, more preferably 3 to 30 g/10 min.

The polyethylene (B) has a density (ASTM D 1505) of 910 to 925 kg/m³, preferably 915 to 925 kg/m³.

The density is measured with a density gradient tube using a strand obtained in the measurement of the melt flow rate at 190° C. under 2.16 kg load ($MFR_{2.16}$), which strand is heated at 120° C. for one hour and gradually cooled to room temperature over a period of one hour.

The polyethylene (B) has desirably a swell ratio of 1.3 or more. The swell ratio indicates a degree of long chain branches, that is, the ratio (Ds/D) of the diameter of a strand (Ds) extruded from a nozzle having an inner diameter (D) of 2.0 mm and a length of 15 mm at an extrusion rate of 10 mm/min at 190° C. to the inner diameter (D) of the nozzle.

The polyethylene (B) has a melt tension (MT: g) at 190° C. and the melt flow rate ($MFR_{2.16}$:g/10 min) measured at 190° C. under 2.16 kg load in accordance with ASTM D 1238 satisfying the following relation:

$$MT>2.2\times(MFR_{2.16})^{-0.84},$$

preferably $$MT>4.0\times(MFR_{2.16})^{-0.84},$$

more preferably $$MT>4.5\times(MFR_{2.16})^{-0.84},$$

still preferably $$MT>4.8\times(MFR_{2.16})^{-0.84}.$$

When the melt tension (MT) and the $MFR_{2.16}$ satisfy the above relation, excellent injection moldability and a good appearance of the injection-molded product are remarkably attained.

The melt tension (MT) is measured as follows. Pellets of the ethylene/α-olefin copolymer are melted at 190° C. and then extruded from a nozzle (length: 8 mm, diameter: 2.095 mm) at a rate of 15 mm/min to prepare a strand. The strand is stretched at a rate of 15 m/min to measure the melt tension.

The polyethylene (B) used in the invention may be a copolymer of polyethylene and a polymerizable monomer such as other α-olefins, vinyl acetate and acrylic ester.

The polyethylene of the invention is not particularly limited as long as the above properties are assured. The method for producing such a polyethylene is neither limited. Of these, preferable is a high-pressure (radical) low-density polyethylene (HPLDPE), which is produced by so-called high pressure radical polymerization and has a large number of branches including long chain branches.

Other Components

The soft resin composition for injection molding of the invention may further contain known additives, such as pigments, heat stabilizers, weathering stabilizers, slip agents, anti-blocking agents, release agents, antistatic agents, fillers, nucleating agents and colorants, in addition to the ethylene/α-olefin copolymer (A) and the polyethylene (B), within the limit not detrimental to the objects of the invention.

Examples of the fillers include carbon black, asbestos, talc, silica and silica-alumina.

Preparation of the Soft Resin Composition for Injection Molding

The soft resin composition for injection molding of the invention can be prepared by melt mixing the ethylene/α-olefin copolymer (A) and the polyethylene (B), and optionally, the additives by a method selected from among various known methods.

Specifically, the soft resin composition for injection molding can be obtained by mixing the above components simultaneously or successively in a Henschel mixer, a V-type blender, a Tumbler mixer or a ribbon blender, and melt kneading the resulting mixture in a kneading machine, e.g., a single screw extruder, a multi-screw extruder, a kneader or a Banbury mixer.

A soft resin composition in which the components are more uniformly dispersed is obtained by the use of a kneading machine having excellent kneading performances, such as an extruder, a kneader and a Banbury mixer.

The additives, e.g., antioxidant, can be added as required at an arbitrary stage.

The soft resin composition comprising the components (A) and (B) of the invention has a Shore A hardness (HAB)(JIS K 6253) of a lower limit of preferably 40 or more, still preferably 50 or more, highly preferably 70 or more, particularly preferably 75 or more, and an upper limit of preferably 95 or less, particularly preferably 90 or less. Specifically, the Shore A hardness is in the range of 40 to 95, preferably 50 to 95, more preferably 70 to 95, highly preferably 75 to 90. When the Shore A hardness is in the above range, particularly when it is 90 or less, the composition can have excellent flexibility.

Polyolefin compositions are generally inferior in moldability, such as releasability, when imparted with flexibility. However, the soft resin composition of the invention having a Shore A hardness of the above range can give a flexible injection-molded product with good moldability.

The soft resin composition for injection molding of the invention desirably has a melt flow rate ($MFR_{2.16}$) (ASTM D 1238, 190° C., 2.16 kg load) of 1.0 to 100 g/10 min, preferably 1 to 50 g/10 min, more preferably 3 to 30 g/10 min.

The soft resin composition for injection molding of the invention preferably has a ratio (HAB/HA) of the Shore A hardness (JIS K 6253) of the soft resin composition for injection molding (HAB) to the Shore A hardness (JIS K 6253) of the ethylene/α-olefin copolymer (A) (HA) of 1.00 to 1.05. The soft resin composition for injection molding having a high Shore A hardness (HAB) is not suitable for use in toys where flexibility is needed.

Injection Molded Product

The injection-molded product of the invention is obtained by injection-molding the soft resin composition for injection molding of the invention into a desired shape.

The injection-molded product may have been subjected to coating on its surface. From the viewpoint of adhesion of coating, the coating is preferably carried out by first coating the surface of the injection-molded product with a primer comprising a styrene elastomer resin graft-polymerized with an α,β-monoethylenically unsaturated group, and then coating the primer-coated surface with a coating material using a coater, e.g., a spray coater,. Through such coating, the injection-molded product is color-finished with a coating material.

The color-finishing with a coating material may be carried out by coating the surface of the injection molded product with a mixture of the primer and a photopolymerization initiator, subjecting the coated surface to UV-ray treatment, and then coating the thus treated surface with a coating material.

The primer comprising a styrene elastomer resin graft-polymerized with an α,β-monoethylenically unsaturated group, can be prepared by graft-polymerizing a known styrene elastomer resin, e.g., a styrene/ethylene/propylene/styrene copolymer, a styrene/ethylene/butylene/styrene copolymer, a styrene/isobutylene/styrene copolymer, a hydrogenated styrene/ethylene/butene/styrene copolymer and a hydrogenated styrene/isobutylene/styrene copolymer, with a monomer having an α,β-monoethylenically unsaturated group.

Examples of such a monomer include:

unsaturated carboxylic acids, e.g., acrylic acid, maleic acid, fumaric acid, tetrahydrophthalic acid, itaconic acid, citraconic acid, crotonic acid, isocrotonic acid and nadic acid™ (endocis-bicyclo(2,2,1)hept-5-ene-2,3-dicarboxylic acid; and unsaturated carboxylic acids, e.g., malenyl chloride, maleimide, maleic anhydride, citraconic anhydride, monomethyl maleate, dimethyl maleate and glycidyl maleate.

The graft polymerization can be carried out by a known graft polymerization method.

For example, there are a method in which the styrene elastomer resin is melted and thereafter a (graft) monomer having an α,β-monoethylenically unsaturated group is added to the molten resin to conduct the graft polymerization, and a method in which the styrene elastomer resin is dissolved in a solvent and thereafter the above graft monomer is added to the solution to conduct the graft polymerization.

When the graft polymerization is carried out in the presence of a radical initiator in the above methods, the graft monomer, e.g., an unsaturated carboxylic acid, can be efficiently graft polymerized. In this case, the radical initiator is used in an amount usually of 0.001 to 1 part by weight based on 100 parts by weight of the random copolymer composition. Examples of the radical initiator include organic peroxides and azo compounds.

As the photopolymerization initiator, there can be used any compounds that generate radicals upon ultraviolet ray irradiation, and examples thereof include benzoin, benzoin methylether, benzophenone and 3,3,4,4-tetrabenzophenone. The photopolymerization initiator is used in an amount of usually about 0.01 to 10% by weight.

Toy and Article for Daily Use

The toy and the article for daily use of the invention are each the injection-molded product described above, and may be uncoated or may have been coated.

EFFECT OF THE INVENTION

According to the present invention, there can be provided a soft resin composition for injection molding, which is capable of producing, with good productivity, a translucent injection-molded product excellent in appearance without substantially decreasing the transparency while maintaining the flexibility inherent in the low crystalline or amorphous ethylene/α-olefin copolymer, and also provided an injection-molded product of such a composition, which can be used as a soft toy or an article for daily use. These injection-molded products may be an uncoated product or a coated product. According to the invention, further, there can be provided an injection-molded product (toy or article for daily use) having been subjected to color-finishing with a coating material and showing excellent adhesion of coating.

EXAMPLES

The present invention is described in more detail with reference to the Examples, which is not to limit the scopes of the invention in any way.

The ethylene/α-olefin copolymers and the polyethylene used in the examples and the comparative examples are given below.

Ethylene/α-olefin Copolymer (A)

(1) Ethylene/1-butene copolymer (EBR1)

$MFR_{2.16}$ (ASTM D 1238, 190° C., 2.16 kg load): 4 g/10 min $MFR_{10}/MFR_{2.16}$ ratio: 5

Density (ASTM D 1505): 885 kg/m$^3$

Mw/Mn: 2.0

Shore A hardness (JIS K 6253): 85

(2) Ethylene/1-butene copolymer (EBR2)

$MFR_{2.16}$ (ASTM D 1238, 190° C., 2.16 kg load): 4 g/10 min $MFR_{10}/MFR_{2.16}$ ratio: 5

Density (ASTM D 1505): 888 kg/m$^3$

Mw/Mn: 2.0

Shore A hardness (JIS K 6253): 87

(3) Ethylene/1-butene copolymer (EBR3)

$MFR_{2.16}$ (ASTM D 1238, 190° C., 2.16 kg load): 4 g/10 min $MFR_{10}/MFR_{2.16}$ ratio: 6

Density (ASTM D 1505): 892 kg/m$^3$

Mw/Mn: 2.0

Shore A hardness (JIS K 6253): 90

Polyethylene (B)

(1) High-pressure low-density polyethylene (HPLDPE)

$MFR_{2.16}$ (ASTM D 1238, 190° C., 2.16 kg load): 3 g/10 min

Density (ASTM D 1505): 917 kg/m$^3$

Melt tension (MT: 190° C.): 150 mN (=15.3 g)

Other Resins (1) High-density polyethylene (HDPE)

$MFR_{2.16}$ (ASTM D 1238, 190° C., 2.16 kg load): 20 g/10 min

Density (ASTM D 1505): 965 kg/m$^3$ (2) Homopolypropylene (PP)

$MFR_{2.16}$ (ASTM D 1238, 230° C., 2.16 kg load): 60 g/10 min

Melting point (Tm): 160° C.

Examples 1 and 2 and Comparative Examples 1 to 6

The ethylene/1-butene copolymer (EBR1) and the high-pressure low-density polyethylene (HPLDPE) were used in an amount shown in Table 1 in each of Examples 1, 2 and Comparative Example 1, and they were extruded using a single screw extruder having a screw diameter of 40 mm at a resin temperature of about 210° C. to prepare pellets of a soft resin composition.

Pellets were prepared by melt-blending a soft resin comprising the ethylene/1-butene copolymer (EBR1) alone in Comparative Example 2, a soft resin comprising the ethylene/1-butene copolymer (EBR2) alone in Comparative Example 37 a soft resin comprising the ethylene/1-butene copolymer (EBR3) alone in Comparative Example 4, a resin composition comprising the ethylene/1-butene copolymer (EBR1) and the high-density polyethylene (HDPE) in Comparative Example 5, and a resin composition comprising the ethylene/1-butene copolymer (EBR2) and the homopolypropylene (PP) in Comparative Example 6.

Then, each of these resins (resin compositions) was injection-molded under the conditions of a resin temperature of 150° C. and a mold temperature of 30° C. to examine the reduction of the cooling time and the presence or absence of molding defects (sinkmarks and flash). The cooling time, the molding defects and the transparency were evaluated. The results are shown in Table 2 and FIGS. 5 to 8.

The cooling time (1) and the molding defects (2) were evaluated by the following method.

(1) Evaluation Method of Cooling Time

The cooling time of a molded product is a period of time that the mold is left closed until the molded product comes to be in a hardened state sufficient for withdrawal from the mold after the injection of the molten resin into the mold.

The expression "hardened state of the molded product sufficient for withdrawal" means that the molded product is hardened to the extent of avoiding permanent set unallowable dimensionwise in view of design when it is withdrawn from the mold suffering external force and its own weight. The expression "external force" used herein means a force applied to the molded product when it is ejected from the mold by an ejector pin, or when it is being handled immediately after released from the mold.

The hardened state of the molded product immediately after the injection molding was evaluated by the following two methods so as to quantitatively evaluate. One is (A) a depth of depression of an ejector pin mark remaining on the molded product after it is released by an ejector pin (referred to as "depression depth" simply hereinafter), and the other is (B) a ratio of a hardness of the molded product immediately after released from the mold to a hardness of the molded product sufficiently hardened at room temperature (such a ratio being referred to as "hardness ratio" simply hereinafter).

The depression depth (A) greatly relates to stickness and frictional force of the molded product to the mold in the mold release by an ejector pin. The shallower the depression depth is, the smoother the mold release is. This means that stickness and frictional force of the molded product to the mold are small.

On the other hand, the hardness ratio (B) indicates a degree of advance of hardening of the molded product immediately after cooling. The closer the hardness ratio to 100% is, the more smoothly the hardening of the molded product advances. This means that permanent distortion due to the external force in the handling immediately after it is released from the mold or due to its own weight hardly takes place.

For the correct evaluation of the cooling time, the (A) and the (B) are desired to be considered at the same time owning to the reasons described below. In the case where the (A) is satisfactory and the (B) is unsatisfactory, the stickness of the molded product to the mold becomes low by the use of, for example, a release agent. Therefore, the molded product can be released from the mold smoothly by an ejector pin to make the depression depth shallow. However, immediately after withdrawal, the molded product suffers permanent distortion due to the external force in the handling or due to its own weight because hardening of the molded product is not advanced sufficiently. On the other hand, in the case where the hardness ratio (B) is high and the depression depth (A) is deep, permanent distortion is hard to arise after the mold release because hardening of the molded product has advanced rapidly. However, when the degree of shrinkage of the molded product is extremely small, permanent distortion may arise on the molded product at the time of operating the ejector pin for the mold release because of the large frictional force generating between the molded product and the mold. In any case, the molded product should be free of the permanent distortion. Accordingly, the (A) and the (B) are to be an essential condition for the releasing of the molded product and the evaluation of the reduction effect of the cooling time is preferably made under such a condition.

The resins (resin compositions) of Examples 1, 2 and Comparative Examples 1 to 6 were subjected to measurement of changes in the depression depth (A) and the hardness ratio (B) according to the cooling time after the injection to evaluate the reduction effect of the cooling time. Details of the test procedure for evaluating the (A) and the (B) are described below together with the size of the molded product and the injection-molding conditions.

Test Procedure for Evaluating the Depression Depth (A) and the Hardness Ratio (B)

Referring to FIG. 1, a mold 1 for injection molding used in preparation of a molded product to be subjected to a test for evaluating the depression depth (A) and the hardness ratio (B), comprises a movable mold 1a and a fixed mold 1b. A cavity 2a is provided in the movable mold 1a. The fixed mold 1b has a plain state. Cooling water can flow through the inside of the molds 1a and 1b, thereby the temperature of the mold 1 can be kept steady. FIG. 1 illustrates the state in which the movable mold 1a and the fixed mold 1b are closed. Referring to FIG. 1, code 3 indicates a mold parting face, code 4 indicates a runner and code 5 indicates a gate.

Figure 2:
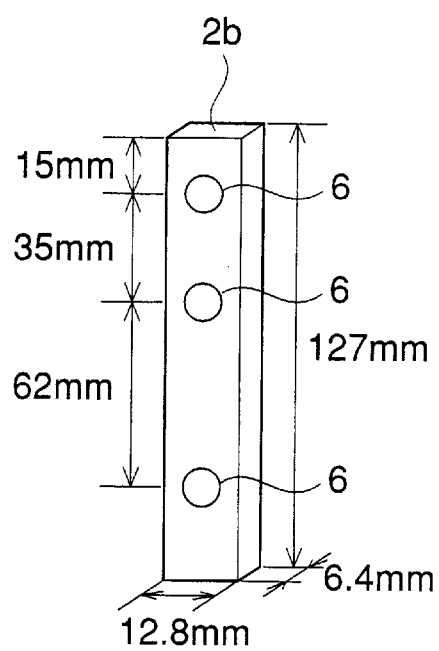
FIG. 2 is a schematic perspective view showing a molded product produced by using the mold shown in FIG. 1.

As shown in FIG. 2, a molded product 2b obtained from the mold 1 is a rectangular parallelepiped of 127 mm×12.8 mm×6.4 mm in size. When the molds 1a and 1b open after the cooling of a predetermined period of time, the molded product 2b remains in the cavity 2. At the time of the succeeding mold release, cylindrical ejector pins having a diameter of 6 mm (not shown in the figure) set up at three points in the cavity 2a provided in the movable mold 1a, eject the molded product 2b at a given rate over the length of about 14 mm to release the molded product 2b from the mold 1a. The position and the shape of the depression left on the molded product 2b by the ejector pins are illustrated in FIG. 2. Code 6 in FIG. 2 indicates a depression of the ejector pin.

Figure 3:
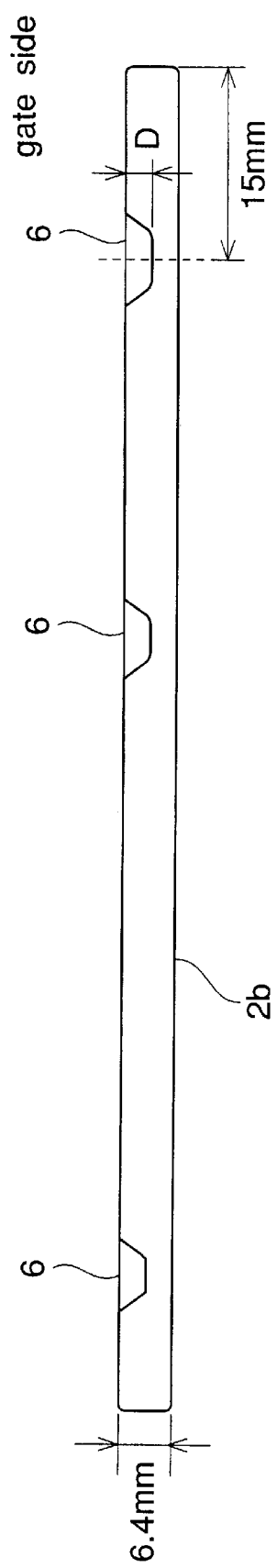
FIG. 3 is a schematic sectional view showing a position to measure a depression depth of the molded product shown in FIG. 2.

In the measurement of the depression depth, the ejection rate of the ejector pin was set low to clarify the difference of the depression depth between the samples. The molded product 2b released from the mold was allowed to stand at room temperature for about half a day or a day for stabilization of the hardened state. Thereafter, as shown in FIG. 3, the depression depth D of the depression 6 of the ejector pin at the vicinity of the gate side was measured.

Figure 4:
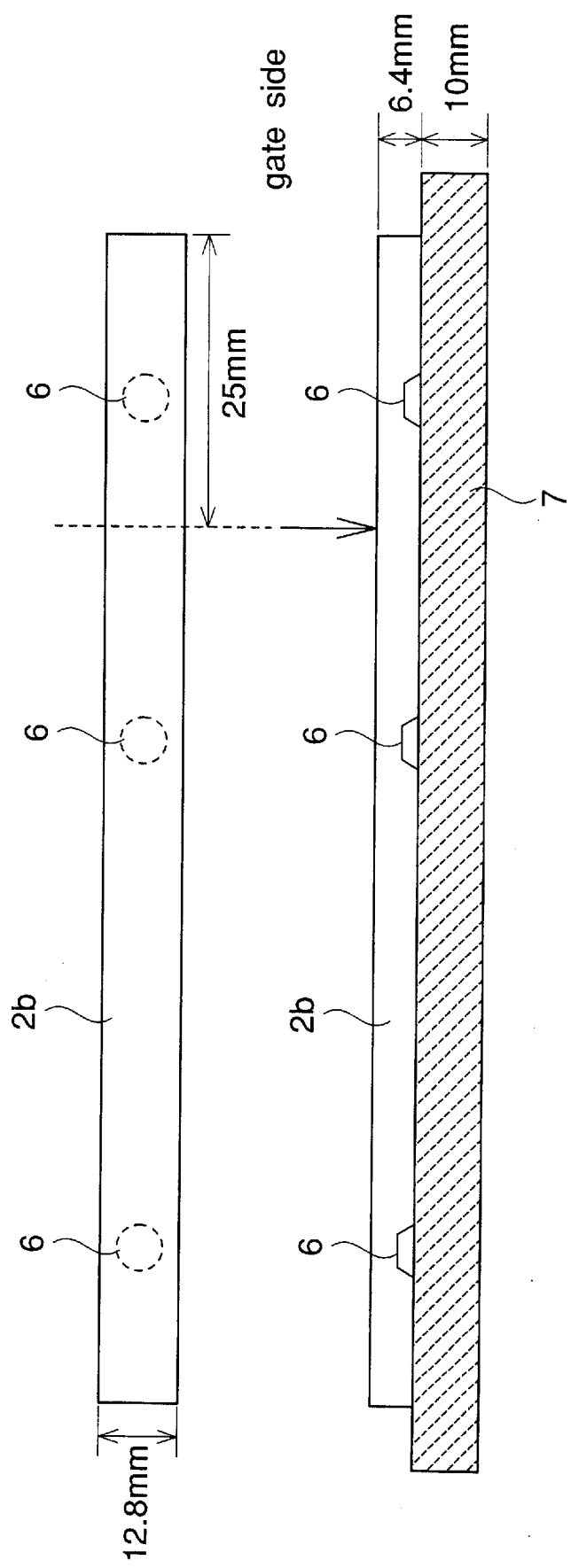
FIG. 4 is a group of a schematic plan view and a schematic sectional view illustrating a measuring position of the Shore A hardness of the molded product shown in FIG. 2.

In the measurement of the hardness ratio, the ejection rate of the ejector pin was set higher than in the measurement of the depression depth to reduce the influence of the depression depth. After the molded product 2b was ejected by the ejector pin, the molded product 2b was placed on a veneer plywood 7 of about 10 mm thickness with the face having the depression downside. When ten seconds lapsed from the ejection of the molded product 2b by the ejector pins, the Shore A hardness of the point indicated by an arrow in FIG. 4 was measured using a simple Shore A hardness meter (ASKER™ of KYOTO KOBUNSHI KEIKI Co., Ltd.). Since the measurement was carried out while the hardening was rapidly advancing, the hardness was determined by reading the value of the moment when approximately one second had passed from the insertion of a needle of the hardness meter, which hardness was taken for H0. When the hardness obtained with the hardening sufficiently advanced at room temperature is taken for H1, the hardness ratio is given by the following formula:

Hardness Ratio (%)=H1/H0×100.

The injection molding machine and the injection molding conditions used in the above evaluation are as follows.

(1) Injection Molding Machine

M-50AIIDM (produced by MEIKI Co,. Ltd., mold clamping force: 50 tons)

Set cylinder temperature:

H1/H3/H4/H5=150/150/150/120 (° C.)

Mold temperature: 30° C.

Injection pressure:

primary pressure/dwell pressure=10/10 (%)

Injection rate:

primary/dwell=15/10 (%)

Metering stroke: 30 mm

Point to make primary/dwell switch: 10 mm

Injector pin speed:

20% in the measurement of the depression depth (low speed)

50% in the measurement of the hardness ratio (standard)

Cooling time:

30 seconds, 20 seconds, 15 seconds, 10 seconds (2) Evaluation method of molding defects The molded product released from the mold was visually observed to confirm the presence or absence of sinkmarks and flash generated.

(3) Evaluation method of transparency

The molded product was visually observed to evaluate the transparency.

TABLE 1

|  | Ex. 1 | Ex. 2 | Cmp-Ex. 1 | Cmp.-Ex. 2 | Cmp-Ex. 3 | Cmp-Ex. 4 | Cmp-Ex.5 | Cmp-Ex. 6 |
| --- | --- | --- | --- | --- | --- | --- | --- | --- |
| Composition (parts by weight) | | | | | | | | |
| EBR1 | 97 | 95 | 85 | 100 | — | — | 98 | — |
| EBR2 | — | — | — | — | 100 | — | — | 98 |
| EBR3 | — | — | — | — | — | 100 | — | — |
| HPLDPE | 3 | 5 | 15 | — | — | — | — | — |
| HDPE | — | — | — | — | — | — | 2 | — |
| PP | — | — | — | — | — | — | — | 2 |
| Molded Product | | | | | | | | |
| Shore A hardness: H0 (Hardness ratio: 100%) | 87 | 90 | 90 | 85 | 87 | 90 | 87 | 87 |

TABLE 2

|  | Example 1 | | Example 2 | | Cmp-Ex. 1 | | Cmp-Ex. 2 | |
| --- | --- | --- | --- | --- | --- | --- | --- | --- |
|  | Depression Depth (mm) | Hardness Ratio (%) | Depression Depth (mm) | Hardness Ratio (%) | Depression Depth (mm) | Hardness Ratio (%) | Depression Depth (mm) | Hardness Ratio (%) |
| Cooling Time (seconds) | | | | | | | | |
| 30 | 0.2 | 32 | 0.2 | 35 | 0.2 | 34 | 0.2 | 30 |
| 20 | 0.3 | 19 | 0.2 | 22 | 0.2 | 19 | 0.7 | 10 |
| 15 | 0.6 | 11 | 0.3 | 18 | 0.4 | 15 | — | — |
| 10 | — | — | 0.4 | 14 | 0.6 | 10 | — | — |
| Molded Product | | | | | | | | |
| Presence or absence of sinkmarks and flashes | Absence | | Absence | | Absence | | Slightly observed | |
| Transparency | Translucent | | Translucent | | Remarkably white clouded | | Translucent | |

TABLE 2-continued

| | Cmp-Ex. 3 | | Cmp-Ex. 4 | | Cmp-Ex. 5 | | Cmp-Ex. 6 | |
|---|---|---|---|---|---|---|---|---|
| | Depression Depth (mm) | Hardness Ratio (%) | Depression Depth (mm) | Hardness Ratio (%) | Depression Depth (mm) | Hardness Ratio (%) | Depression Depth (mm) | Hardness Ratio (%) |
| Cooling Time (seconds) | | | | | | | | |
| 30 | 0.2 | 31 | 0.2 | 34 | 0.2 | 31 | 0.2 | 30 |
| 20 | 0.6 | 11 | 0.2 | 19 | 0.5 | 11 | 0.6 | 10 |
| 15 | — | — | 0.4 | 15 | — | — | — | — |
| 10 | — | — | 0.6 | 10 | — | — | — | — |
| Molded Product | | | | | | | | |
| Presence or absence of sinkmarks and flashes | Slightly observed | | Absence | | Slightly observed | | Slightly observed | |
| Transparency | Translucent | | Translucent | | Remarkably white clouded | | Translucent | |

Note: the symbol [—] in the tables means that the molded product was so much remarkably deformed owning to its self weight that the measurement was not practicable.

In general, ethylene/α-olefin copolymers have a feature that the hardening rate in the solidification from a molten state is accelerated as the hardness increases, and therefore, the cooling time in the injection molding are shortened, and sinkmarks and flash is hard to occur.

The effect of the present invention was inspected under the conditions of the same hardness of the molded product sufficiently hardened at room temperature.

Based on the results of Example 1 and Comparative Examples 3, 5 and 6 in which the Shore A hardness (hardness ratio: 100%) of the molded product sufficiently hardened at room temperature was 87, the reduction effect of the cooling time in Examples 1 and 2, and the inhibitory effect of the molding defects such as sinkmarks and flash will be described.

Figure 5:
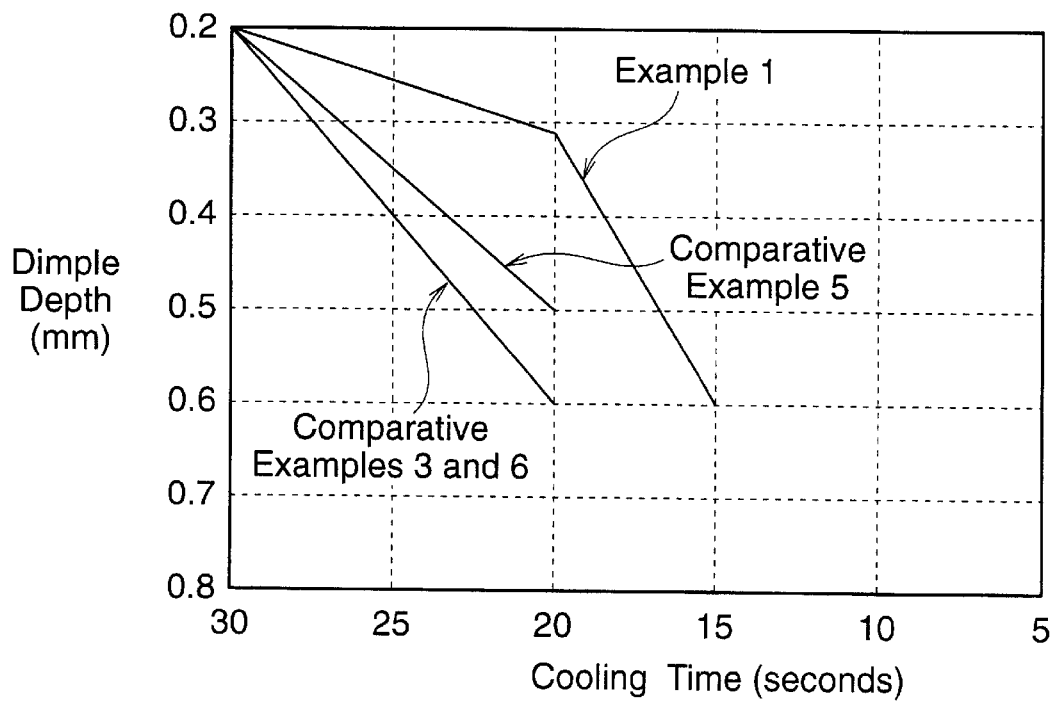
FIG. 5 is a graph showing a relation between a cooling time and a depression depth of the molded products produced in Example 1 and Comparative Examples 3, 5 and 6, each of the molded products having a Shore A hardness (at 100% hardness ratio) of 87.
Figure 6:
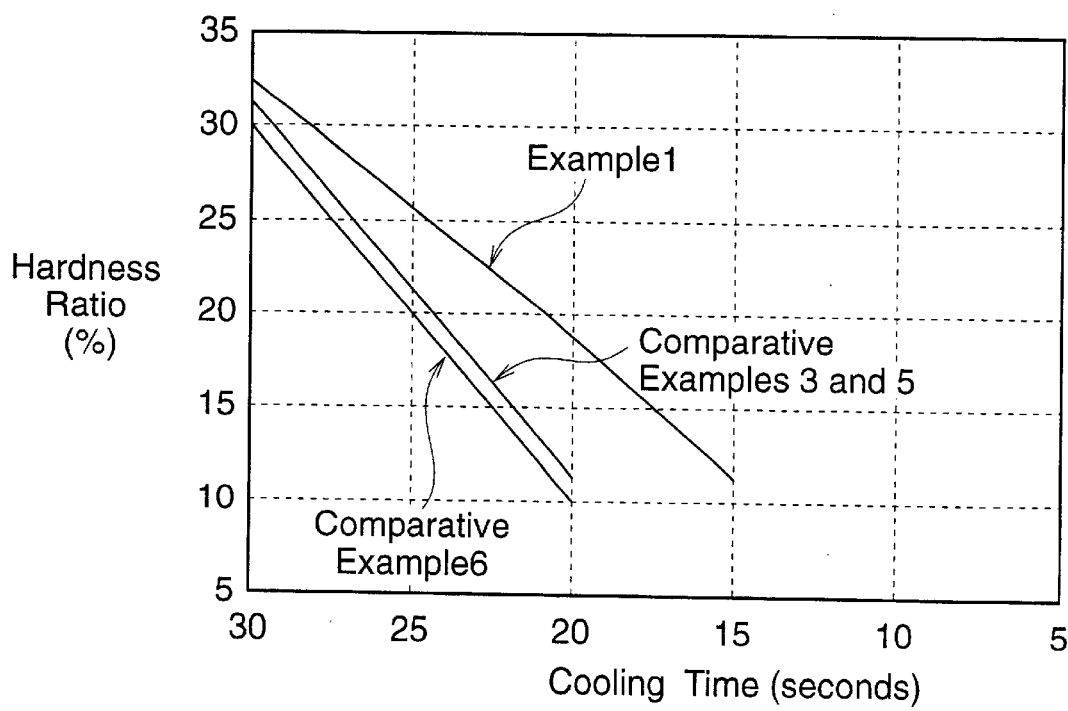
FIG. 6 is a graph showing a relation between a cooling time and a hardness ratio of the molded products produced in Example 1 and Comparative Examples 3, 5 and 6, each of the molded products having a Shore A hardness (at 100% hardness ratio) of 87.

As shown in Table 2 and FIGS. 5 and 6, in the range of cooling time of 30 seconds to 15 seconds in which the molded product is remarkably deformed owning to its self weight, Example 1 shows a shallower depression depth and a higher hardness ratio than those of Comparative Examples 3, 5 and 6 measured after the same cooling time. That is, the ethylene/1-butene copolymer (EBR1) comprising 3 parts by weight of HPLDPE of Example 1 has a short cooling time in comparison with the ethylene/1-butene copolymer (EBR2) of Comparative Example 3, the composition comprising the ethylene/1-butene copolymer (EBR1) and 2 parts by weight of HDPE of Comparative Example 5 and the composition comprising the ethylene/1-butene copolymer (EBR2) and 2 parts by weight of PP of Comparative Example 6.

Figure 7:
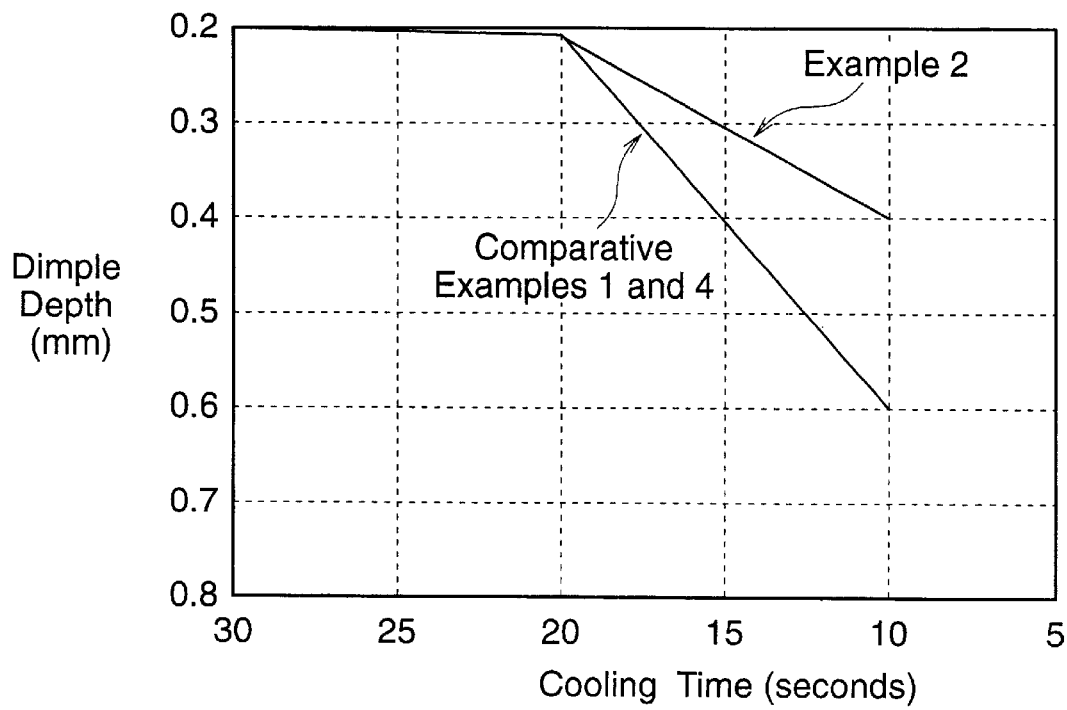
FIG. 7 is a graph showing a relation between a cooling time and a depression depth of the molded products produced in Example 2 and Comparative Examples 1 and 4, each of the molded products having a Shore A hardness (at 100% hardness ratio) of 90.
Figure 8:
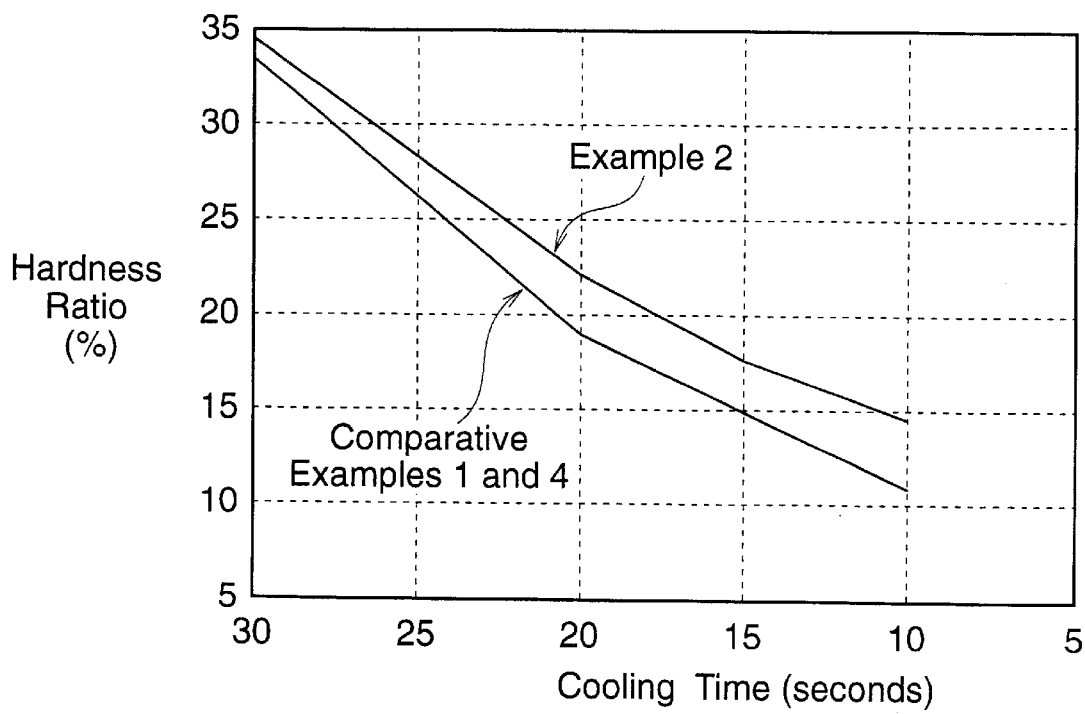
FIG. 8 is a graph showing a relation between a cooling time and a hardness ratio of the molded products produced in Example 2 and Comparative Examples 1 and 4, each of the molded products having a Shore A hardness (at 100% hardness ratio) of 90.

In case of Example 2 and Comparative Examples 1 and 4 in which the Shore A hardness (hardness ratio=100%) shown in Table 1 was 90, as shown in Table 2 and FIGS. 7 and 8, Example 2 shows a shallower depression depth and a higher hardness ratio than those of Comparative Examples 1 and 4 measured after the same cooling time. This means that the reduction effect of the cooling time is not attained when HPLDPE is excessively added.

Examples 1 and 2 show that sinkmarks and flash are not observed on the molded product released from the mold, whereas Comparative Examples 2, 3, 5 and 6 show that sinkmarks and flash are slightly observed on the molded product released from the mold. Both of Comparative Examples 1 and 5 show that the translucency which is a characteristic of the ethylene/α-olefin copolymer is unfavorably substantially deteriorated.

From the results shown in Examples and Comparative Examples, it can be said that the soft resin composition for injection molding of the present invention is a soft polyolefin resin composition for injection molding which can shorten the cooling time in the injection molding and control the molding defects such as sinkmarks and flash while maintaining the flexibility inherent in the ethylene/αolefin copolymer without substantially decreasing the transparency.

What is claimed is:

1. A soft resin composition for injection molding comprising:
   (A) 94 to 99 parts by weight of an ethylene/α-olefin copolymer comprising ethylene and an α-olefin of 3 to 10 carbon atoms and having
      (i) a Shore A hardness (JIS K 6253) of 40 to 95,
      (ii) a melt flow rate ($MFR_{2.16}$) as measured at 190° C. under 2.16 kg load in accordance with ASTM D 1238 of 1.0 to 20 g/10 min, and
      (iii) a density (ASTM D 1505) of 855 to 900 kg/m³; and
   (B) 1 to 6 parts by weight of a homo- or copolymer of polyethylene having
      (i) a melt flow rate ($MFR_{2.16}$) as measured at 190° C. under 2.16 kg load in accordance with ASTM D 1238 of 0.1 to 100 g/10 min,
      (ii) a density (ASTM D 1505) of 910 to 925 kg/m₃, and
      (iii) a melt tension measured at 190° C. and the $MFR_{2.16}$ satisfying the following relation:

$$\text{melt tension} > 4.0 \times (MFR_{2.16})^{-0.84}.$$

wherein the sum of the component (A) and the component (B) is 100 parts by weight.

2. The soft resin composition for injection molding according to claim 1, wherein the composition comprising the component (A) and the component (B) has a Shore A hardness of 90 or less.

3. The soft resin composition for injection molding according to claim 1, wherein the ratio (HAB/HA) of the Shore A hardness (JIS K 6253) of the soft resin composition for injection molding (HAB) to the Shore A hardness (JIS K 6253) of the ethylene/α-olefin copolymer (A) (HA) is in the range of 1.00 to 1.05.

4. The soft resin composition for injection molding according to claim 1, wherein the ethylene/α-olefin copolymer (A) has:

(iv) a molecular weight distribution (Mw/Mn) determined with a gel permeation chromatography (GPC) of 1 to 3, and (v) a ratio (MFR$_{10}$/MFR$_{2.16}$ of a melt flow rate (g/10min) measured at 190° C. under 10 kg load in accordance with ASTM D 1238 (MFR$_{10}$) to the MFR$_{2.16}$ (g/10 min) of 5 to 20.

5. The soft resin composition for injection molding according to claim 1, wherein the ethylene/α-olefin copolymer (A) is a mixture of at least two ethylene/α-olefin copolymers (A).

6. The soft resin composition for injection molding according to claim 1, wherein the polyethylene is a high-pressure low-density polyethylene.

7. An injection-molded product comprising the soft resin composition for injection molding according to any one of claims 1 to 6.

8. The injection-molded product according to claim 7, having been subjected to coating on the surface.

9. A toy comprising the injection-molded product according to claim 8.

10. An article for daily use comprising the injection-molded product according to claim 8.

11. The injection-molded product according to claim 7, having been subjected to coating on the surface by color-finishing with a coating material, said color-finishing being made by coating the surface of the injection-molded product with a primer comprising a styrene elastomer resin graft-polymerized with a monomer having an α, α- monoethylenically unsaturated group, and then conducting the coating.

12. A toy comprising the injection-molded product according to claim 11.

13. An article for daily use comprising the injection-molded product according to claim 11.

14. The injection-molded product according to claim 7, having been subjected to coating on the surface by color-finishing with a coating material, said color-finishing being made by coating the surface of the injection-molded product with a mixture of a primer comprising a styrene elastomer resin graft-polymerized with a monomer having an α, β-monoethylenically unsaturated group and a photopolymerization initiator, subjecting the coated surface to UV-ray treatment, and then conducting the coating.

15. A toy comprising the injection-molded product according to claim 14.

16. An article for daily use comprising the injection-molded product according to claim 14.

17. A toy comprising the injection-molded product according to claim 7.

18. An article for daily use comprising the injection-molded product according to claim 7.

* * * * *